US006487648B1

(12) United States Patent
Hassoun

(10) Patent No.: US 6,487,648 B1
(45) Date of Patent: Nov. 26, 2002

(54) SDRAM CONTROLLER IMPLEMENTED IN A PLD

(75) Inventor: Joseph H. Hassoun, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/464,215

(22) Filed: Dec. 15, 1999

(51) Int. Cl.[7] ............................................. G06F 12/00
(52) U.S. Cl. ...................... 711/167; 326/39; 713/503; 713/400; 716/16
(58) Field of Search ................. 713/503, 600, 713/400, 401; 716/16, 17; 326/39; 365/233; 711/105, 167

(56) References Cited

U.S. PATENT DOCUMENTS

| | | | |
|---|---|---|---|
| 5,319,252 A | | 6/1994 | Pierce et al. |
| 5,331,220 A | | 7/1994 | Pierce et al. |
| 5,535,342 A | * | 7/1996 | Taylor ......................... 710/127 |
| 5,717,644 A | * | 2/1998 | Fladderman et al. ........ 365/222 |
| 5,737,612 A | * | 4/1998 | Ansel et al. ................. 713/300 |
| 5,917,761 A | * | 6/1999 | Tietjen et al. ............... 365/194 |
| 5,926,838 A | * | 7/1999 | Jeddeloh ...................... 711/167 |
| 5,959,929 A | | 9/1999 | Cowles et al. |
| 5,982,697 A | | 11/1999 | Williams et al. |
| 5,995,424 A | * | 11/1999 | Lawrence et al. .......... 365/201 |
| 6,043,677 A | * | 3/2000 | Albu et al. ................... 326/39 |
| 6,107,826 A | * | 8/2000 | Young et al. ................. 326/41 |
| 6,130,552 A | * | 10/2000 | Jefferson et al. ............. 326/39 |
| 6,154,078 A | * | 11/2000 | Stave .......................... 327/263 |
| 6,191,613 B1 | * | 2/2001 | Schultz et al. ................ 326/39 |
| 6,201,754 B1 | * | 3/2001 | Ooishi et al. ............... 365/226 |
| 6,219,747 B1 | * | 4/2001 | Banks et al. ................. 711/105 |
| 6,233,694 B1 | * | 5/2001 | Allard et al. ................ 713/400 |

OTHER PUBLICATIONS

Micron Technology, Inc., "Synchronous DRAM," 16Mb: x16 SDRAM, p. 1–48, ( Dec. 10, 1998).
Xilinx, Inc., "Using the Virtex Delay–Locked Loop," XAPP132, No. 1.4, p. 1–9, ( Oct. 11, 1999).
Xilinx, Inc., "Using The Virtex SelectI/O," XAPP133, No. 1.2, p. 1–16, ( Oct. 11, 1999).

* cited by examiner

Primary Examiner—Hong Kim
(74) Attorney, Agent, or Firm—Jeanette S. Harms

(57) ABSTRACT

A programmable logic device (PLD) implementing an SDRAM controller is provided. The configurable logic of the PLD forms an interface between the system and the SDRAM, as well as a state machine to operate the controller and the interface. In this manner, many functions of the SDRAM controller can be selectively controlled and easily changed by reprogramming the PLD. The configurable logic of the PLD also forms a state machine to operate the controller and the interface. In accordance with the present invention, dedicated circuits of the PLD optimize performance of the SDRAM controller. These dedicated circuits include two delay locked loops (DLLs) which eliminate skew between the system clock, a global clock in the PLD, and the SDRAM clock.

7 Claims, 10 Drawing Sheets

SDRAM CONTROLLER IMPLEMENTED IN A PLD

BACKGROUND OF THE INVENTION

1. Field of the Invention

The present invention relates to synchronous dynamic random access memory (SDRAM), and particularly to an SDRAM controller implemented in a programmable logic device (PLD).

2. Description of the Related Art

The clock rates of the first microprocessors were limited to a range between 1 and 10 Mhz. Typically, even the simplest of instructions, required several clocks to execute. Assuming a main memory cycle time of 250 nanoseconds, approximately 4 million accesses to main memory were needed every second to maintain the first processors at their maximum speed. Asynchronous dynamic random access memory (DRAM) chips, having an access time of 80–100 nanoseconds, met these requirements.

Next generation microprocessors advanced to internal clock speeds in excess of 100 Mhz. However, the DRAM of the time, which had advanced to 60 nanosecond access time, thereby still requiring 10–12 clock cycles to fill a cache line, could not keep pace with those microprocessors. To solve this problem, Fast Page Mode (FPM) DRAMs and EDO (Extended Data Out) DRAMs were developed which provided some performance improvement.

Eventually, improvements in semiconductor processing technology enabled microprocessors to operate beyond 133 Mhz. However, development of a memory device to take full advantage of this speed proved more difficult. Virtually all then available DRAM devices used asynchronous clocking systems, i.e. the clocking signals necessary to perform memory access functions were not synchronized to the associated microprocessor. Specifically, although memories were accessed by signals sent by the microprocessor, the exact time interval between the time a request was sent to a memory and the time a response was received was dependent on the particular internal features of the memory. Thus, system designers had to allow for the "worst case" response time between requests for information and the anticipated time the information would be available. This "worst case" response time necessarily wasted time in handling many memory functions.

After extensive research, a type of memory called synchronous DRAM (SDRAM) was developed to operate with these megafast microprocessors. SDRAM is a generic name for various kinds of DRAM that are synchronized with the optimal clock speed of the microprocessor. In this manner, an SDRAM can increase the number of instructions that the microprocessor can perform in a given time.

Typically, SDRAMs are fabricated as separate integrated circuits from other system components. The SDRAMs, microprocessor, and other components of the system are interconnected via a system bus. An SDRAM controller, which is placed between the system bus and the SDRAM, facilitates communication between the microprocessor and the SDRAM, as well as provides a "window" into the functioning of the SDRAM.

Currently, many of these SDRAM controllers are application specific integrated circuits (ASICs), which provide specific functionality for predetermined SDRAMs. Unfortunately, the extensive engineering necessary to develop and the long lead time associated with the manufacture of these custom devices render ASIC SDRAM controllers an expensive component of the system. This disadvantage is further exacerbated by the continuing fast pace of SDRAM technology development. Thus, by the time an ASIC SDRAM controller is placed in the system and the system is commercially available, new features are introduced on the next generation of SDRAM devices, thereby necessitating another expensive, ASIC development.

Therefore, a need arises for a device to implement an SDRAM controller which reduces the current lead time development of the controller as well as the time to market.

SUMMARY OF THE INVENTION

In accordance with the present invention, a programmable logic device (PLD) implements the SDRAM controller. The configurable logic of the PLD forms an interface between the system and the SDRAM, as well as a state machine to operate the controller and the interface. In this manner, many functions of the SDRAM controller can be selectively controlled and easily changed by reprogramming the PLD. For example, in one embodiment, the number of locations as well as the sequence of memory access in the burst mode are programmable in the PLD.

The state machine, implemented by the configurable logic of the PLD, includes the following steps during a Write operation. If the system issues a WRITE command, but a Ras-to-Cas Delay time in the SDRAM has not been met, then the controller enters a Write Wait for Ras-to-Cas Delay state. However, if the system issues a WRITE command, and the Ras-to-Cas Delay time in the SDRAM has been met, then the controller enters a Write Command state in which the controller issues data and a WRITE command to the SDRAM. After the WRITE command is issued, the controller continues to provide data in a Write state until burst end, at which time the controller returns to an Idle state.

The state machine includes the following steps during a Read operation. If the system issues a READ command, but a Ras-to-Cas Delay time in the SDRAM has not been met, then the controller enters a Read Wait for Ras-to-Cas Delay state. However, if the system issues a READ command, and the Ras-to-Cas Delay time in the SDRAM has been met, then the controller enters a Read Command state and issues a READ command to the SDRAM. After the Read Command state, the controller automatically enters a Read Command, Wait for Cas Latency state. After the Read Command, Wait for Cas Latency state, the controller reads data in a Read state until burst end, at which time the controller enters an Idle state.

Specific PLDs, such as the Xilinx Virtex field programmable gate arrays (FPGAs), provide features which optimize the design of the SDRAM controller. In accordance with the present invention, dedicated circuits of the PLD eliminate skew between the system clock, a global clock in the PLD, and the SDRAM clock. These dedicated circuits include a first delay locked loop (DLL) receiving the system clock and outputting the SDRAM clock and a first feedback signal to the first DLL, and a second DLL receiving the system clock and outputting a second feedback signal to the second DLL. Of importance, the first feedback signal is external to the PLD and the second feedback signal is internal to the PLD.

In one embodiment, a global clock buffer on the PLD drives the system clock to the first and second DLLs. Other global clock buffers on the PLD drive the feedback signals to the DLLs.

Other dedicated circuits that optimize the SDRAM controller include a flip-flop associated with each input and output buffer of the input/output (I/O) blocks in the PLD. The present invention registers the input signals from and output signals to the SDRAMs. The I/O block further includes a programmable delay connected to the D input of the flip-flop registering the input signals to the PLD. The delay in matched to the internal clock distribution delay of the PLD, thereby eliminating pad-to-pad hold time.

BRIEF DESCRIPTION OF THE DRAWINGS

Note that similar elements are labeled with similar reference numerals.

DETAILED DESCRIPTION OF THE DRAWINGS

Programmable logic devices (PLDS) are well known in the art. In one type of PLD, a field programmable gate array (FPGA), a plurality of configurable logic blocks (CLBS) which perform logic functions are interconnected using a programmable interconnect. Input/output (I/O) blocks on the periphery of the device provide programmable connections between the FPGA and external devices. A configuration bitstream, generated by a software tool, programs the PLD to perform the user-defined logic functions.

In accordance with the present invention, a PLD implements an SDRAM controller. Certain hardware elements of the PLD are used to maximize performance of the controller. Moreover, reprogrammable features of the PLD are used to provide optimal flexibility in the functionality of the controller. In the embodiment described in detail below, the PLD implementing the SDRAM controller is a Virtex™ FPGA sold by Xilinx, Inc. of San Jose, Calif. However, the present invention may be implemented in other FPGAs, PLDs, or even other types of devices, such as system-on-a-chip devices.

To explain the functioning of the controller in the present invention, a brief description of an SDRAM is beneficial and therefore is provided herein. For purposes of illustration only, a specific SDRAM, the MT48LC1M16A1 SDRAM sold by Micron Technology, Inc. of Boise, Id., is described. The PLD SDRAM controller of the present invention is described in an embodiment that would interface with this SDRAM. However, the present invention can interface with any SDRAM and therefore should not be limited to such an embodiment. For additional details on this SDRAM, the reader is directed to the Data Sheet for the MT48LC1M16A1 SDRAM device, entitled, "SYNCHRONOUS DRAM", available on Micron's web site (www.micron.com) and last revised on Oct. 10, 1998. U.S. Pat. Nos. 5,982,697 and 5,959,929, issued to Micron Technology, Inc. on Nov. 9, 1999 and Sep. 28, 1999, respectively, explain the internal structure and functioning of an SDRAM, and are incorporated by reference in their entirety herein.

Figure 1:
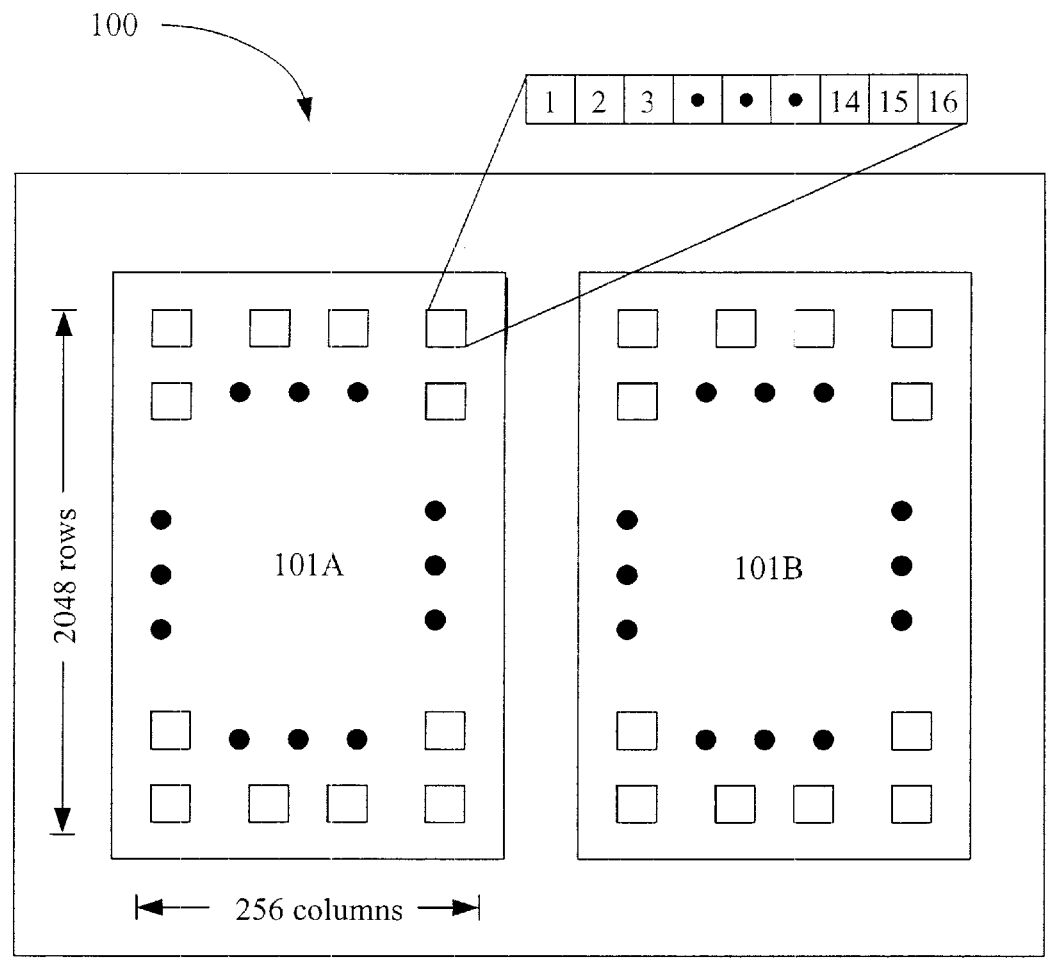
FIG. 1 illustrates a simplified block diagram of an SDRAM including two banks.

In general, an SDRAM is a multi-bank array, which allows one bank to be accessed while another bank is precharged or refreshed. Simultaneously performing different operations in multiple banks minimizes normal precharge and refresh idle time. FIG. 1 illustrates a dual 512K×16 SDRAM 100 having banks 101A and 101B. Each bank 101 is organized as 2,048 rows by 256 columns by 16 bits (a "bit group"). Note that the size of the array on SDRAM 100 (1 Meg×16) is illustrative only and other embodiments of the present invention may include different numbers of rows, columns, and bits.

In addition to the array, SDRAM 100 (referenced hereinafter simply as the SDRAM) includes other standard DRAM array elements (not shown), such as row and column decoders, and a refresh counter, as well as specialized elements (also not shown), such as latency and burst-length registers, a data-input register, and programming and timing registers. All of these elements are well known in the art of SDRAMs and therefore are not explained in detail herein.

Initialization of the SDRAM generally includes a sequence of precharge-all-banks, auto-refresh, and mode-register-set commands, although this sequence may vary depending on the manufacturer's specifications.

In the SDRAM, all inputs are sampled at the positive edge of an input clock, and all outputs are valid on subsequent positive edges, thereby allowing accesses to take place every clock cycle. The SDRAM also latches the input signals on the positive edge, thereby freeing the microprocessor from having to drive those signals for the entire read or write cycle. After a preset number of clock cycles (described in detail below), the data is available on the output latches of the SDRAM for a READ, or can be written into its memory for a WRITE.

Table 1 below indicates the signal names, the type of signal (either an input to or an output from the SDRAM), and a brief description of the signals typically used in read/write operations of the SDRAM.

TABLE 1

Interfacing Signals for 16 Megabit SDRAM

| SIGNAL NAME | TYPE | DESCRIPTION |
| --- | --- | --- |
| CS | Input | Chip Enable |
| CLK | Input | Clock |
| CKE | Input | Clock Enable |
| RAS | Input | Row Address Strobe |
| CAS | Input | Column Address Strobe |
| WE | Input | Write Enable |
| DQML, DQMH | Input | Data Mask for Lower, Upper bytes |
| BA | Input | Bank Address |
| A0–A10 | Input | Address |
| DQ0–DQ15 | Input/Output | Data |

The SDRAM has row and column addresses like a conventional DRAM. Thus, Row Address Strobe (RAS), Column Address Strobe (CAS), Write Enable (WE), Address (A0–A10), and Data (DQ) signals have similar functions to those of a conventional DRAM. Note that the row address is presented while RAS is active Low (SDRAM ACT cycle).

Accesses begin with the registration of an ACTIVATE ROW command, followed by a READ or WRITE command. The address bits registered coincident with the ACTIVATE ROW command are used to select the intended bank and row. In accordance with the dual-bank array SDRAM of FIG. 1, a bit BA (Bank Address) selects the bank, whereas address bits A0–A10 select the row. The address bits coincident with the READ or WRITE command are used to select the starting column location for the burst access.

Figure 2:
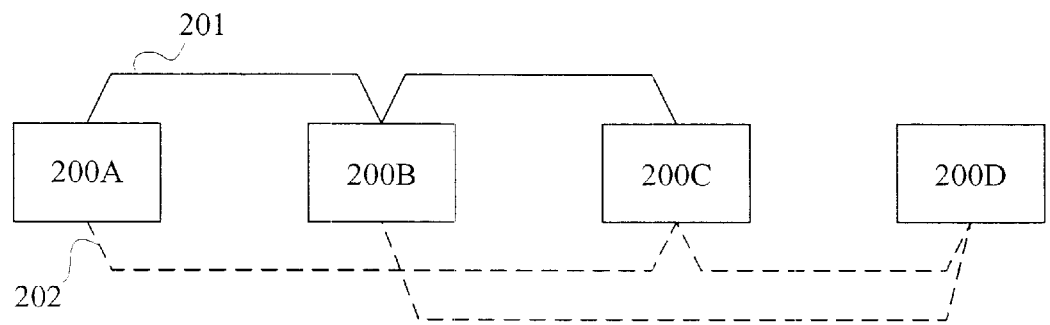
FIG. 2 illustrates a simplified block diagram of four sets of upper/lower SDRAM bytes with paths indicating serial and interleaved accesses.

Like conventional DRAMS, SDRAMs offer burst-mode cycles, which access different column addresses. However the read and write burst accesses to the SDRAM are typically more complex than those in conventional DRAMs. For example in a conventional DRAM, a burst access starts at a selected location and continues for a programmed number of locations in a series fashion. Thus, referring to FIG. 2, a conventional burst access may proceed in the sequence designated by line 201 (bit groups 200A, 200B, 200C). However, in the SDRAM the burst access starts at a selected location and continues for a programmed number of locations in a programmed sequence (not necessarily in series). Thus, a burst access in the SDRAM may proceed in the sequence designated by line 201 or in the sequence designated by line 202 (bit groups 200B, 200D, 200C, and 200A). Burst-mode access allows the controller to write multiple words to or to read multiple words from the SDRAM without paying the penalty of a separate access for each word written or read.

To support this burst-mode functionality, SDRAM burst-mode cycles required new signals such as: CLK, CKE, DQML, DQMH, and BA. CLK is a free-running clock from which other signals are synchronized. CKE is an enable signal that gates other control inputs. For example, if CKE is false, then the SDRAM ignores all other inputs. DQML and DQMH are byte-input enables during write cycles and output enables during read cycles that provide data masks for lower and upper bytes, respectively (note that a byte typically includes 8 bits, and each bit set of the SDRAM includes 2 bytes (upper+lower)) BA (previously mentioned) identifies the bank where ACT, READ, WRITE, or PRE-CHARGE commands are being applied. BA is also used to program the 12th bit of the mode register (described in detail below).

The mode register, located on the SDRAM, defines the specific SDRAM mode of operation as well as the selection of burst length. The mode register, programmed via the LOAD MODE REGISTER command, retains stored information until it is reprogrammed or the device loses power. Table 2 below indicates the various mode register fields, the number of bits associated with each field, and a brief description of each field.

TABLE 2

Mode Register Definition for 16M SDRAM Device

| Mode Register Field | # of bits | Description |
| --- | --- | --- |
| M0–M2 | 3 | Burst Length |
| M3 | 1 | Burst Type |
| M4–M6 | 3 | CAS Latency |
| M7–M8 | 2 | Operation Mode |
| M9 | 1 | Write Burst Mode |
| M10–M11 | 2 | Reserved |

Mode register bits M0–M2 specify burst length. Burst length determines the maximum number of column locations that can be accessed for a given READ or WRITE command. Mode register bit M3 specifies the burst type (sequential (see line 201 in FIG. 2) or interleaved (see line 202)). Burst lengths of one, two, four, or eight locations are available for both sequential and interleaved burst types, and a full-page burst is available for the sequential type. The full-page burst type is used with the BURST TERMINATE command to generate arbitrary burst lengths.

Mode register bits M4–M6 specify the CAS Latency. CAS latency is the delay in clock cycles between registration of a READ command and availability of the first output data. Latency can be set to one, two, or three clocks, but some devices might not support CAS latency of one. If a READ command is registered at a clock edge n, and the latency is m clocks, data becomes available by clock edge n+m. Data DQ start driving at the prior clock edge (n+m−1). If the relevant access times are met, data is valid by clock edge (n+m).

Mode register bits M7 and M8 are used on some SDRAMs to specify the operation mode. Normal operating mode is selected by setting bits M7 and M8 to zero; other values for bits M7 and M8 are reserved for future use or for test modes. Some SDRAM devices do not support an Operating Mode choice.

Mode register bit M9 specifies the Write Burst Mode on some SDRAMs. When bit M9=0, the burst length determined by bits M0–M2 applies to both READ and WRITE bursts; however, when bit M9=1, the programmed burst length applies to READ bursts only, and write access is single-location (nonburst).

Finally, mode register bits M10 and M11 are reserved for future use.

Note that the mode register must be loaded when all banks are idle, and the controller must wait a specified length of time ($t_{MRD}$) before initiating any subsequent operation. The results of violating these requirements are unpredictable.

Once the mode register is loaded, the SDRAM is ready to receive commands to perform various operations. Each command includes predetermined, multiple signals. Table 3 below summarizes the standard SDRAM commands and the states of their respective signals.

TABLE 3

SDRAM Commands Truth Table

| Function | Symbol | CS | RAS | CAS | WE | BA | A10 | A9–0 | Note |
| --- | --- | --- | --- | --- | --- | --- | --- | --- | --- |
| Device Deselect | DSEL | H | X | X | X | X | X | X | 2 |
| No Operation | NOP | L | H | H | H | X | X | X | 2 |
| Read | READ | L | H | L | H | V | L | V | 2, 3 |
| Read w/ auto precharge | READAP | L | H | L | J | V | H | V | 2, 3 |
| Write | WRITE | L | H | L | L | V | L | V | 2, 3 |
| Write w/ auto precharge | WRITEAP | L | H | L | L | V | H | V | 2, 3 |
| Bank Activate | ACT | L | L | H | H | V | V | V | 2 |
| Precharge selected bank | PRE | L | L | H | L | V | L | X | 2 |
| Precharge all banks | PALL | L | L | H | L | X | H | X | 2 |
| Auto Refresh | CBR | L | L | L | H | X | X | X | 2, 4 |
| Load Mode Register | MRS | L | L | L | L | V | V | V | 2 |

Notes:
1. H: High level, L: Low level, X: Don't Care, V: Valid data input.

2. CKE is assumed to be High during all of these commands.
3. Only A7–A0 are needed to determine the Column address.
4. Self refresh uses the same command when CKE is Low.

For a device deselect, the CS signal is deactivated (brought high), thereby instructing the SDRAM to ignore all control inputs. Hence, all other signals in the deselect mode are "don't care". In a No Operation mode (NOP), signal CS is active and signals RAS, CAS, and WE are deactivated. For both deselect and NOP modes, the current operation finishes when either of these commands is issued.

The bank activate command (ACT) selects a row in a specified bank of the SDRAM. In this mode, signals CS and RAS are active, and signals CAS and WE are deactivated. Read and write operations can only be initiated on this activated bank after a minimum time $t_{RCD}$ from the ACT command. Valid data inputs are provided via signals BA and A0–A10.

The READ and READ w/Auto Precharge (READAP) commands are used after the bank activate command (BA) to initiate the burst read of data. The READ command is initiated by activating signals CS and CAS, and de-activating signals WE and RAS at the same clock sampling (rising) edge. Signal A10 determines whether the READ mode or the READAP mode is initiated. Note that the burst length and the latency time are functions of the values programmed by the MRS command (described below).

The WRITE and WRITE w/Auto Precharge (WRITEAP) commands are used after the bank activate command (BA) to initiate a burst write. A WRITE operation is initiated by de-activating signal RAS and activating signals CS, CAS, and WE at the same clock sampling (rising) edge. Valid data inputs are provided via signals BA (indicated above) and A0–A9. Signal A10 determines whether the WRITE mode or the WRITEAP mode is initiated. As in the READ operation, the burst length and latency are determined by the values programmed by the MRS command.

The Mode Register Set command (MRS) is used to program the SDRAM for the desired operating mode. For this command, signals CS, RAS, CAS, and WE are active and valid data inputs are provided via signals BA and A0–A10. This command should be used after power is initiated, but before actual operation of the SDRAM. Additionally, the SDRAM functionality can be altered by reprogramming the mode register through the execution of the MRS command if all the banks are pre-charged (i.e. in idle state) before the MRS command is given.

PLD SDRAM Controller Design

Figure 3:
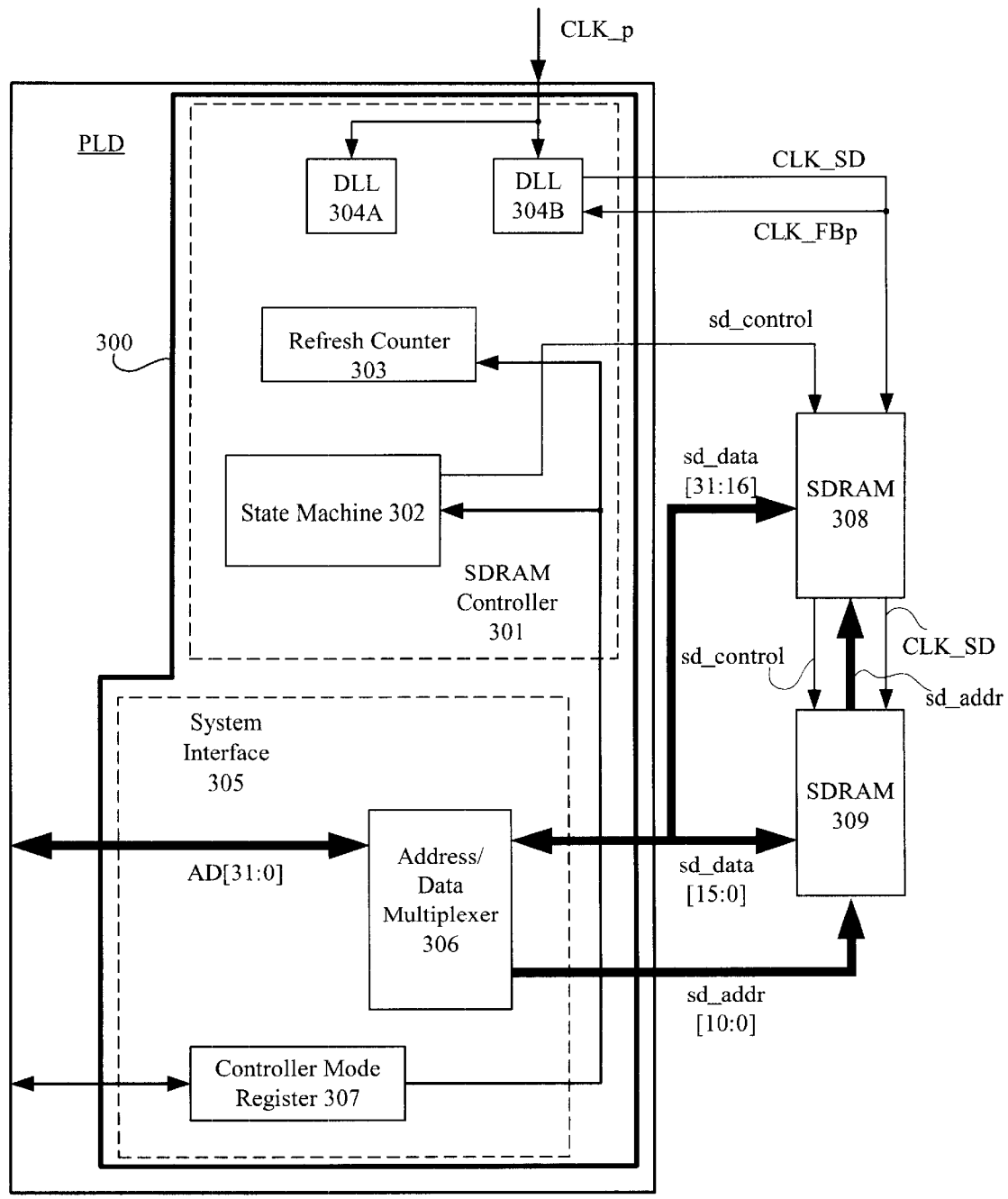
FIG. 3 illustrates a simplified block diagram of a PLD in accordance with the present invention implemented as an SDRAM controller interfacing to two SDRAMs.

FIG. 3 illustrates a PLD in accordance with the present invention that is configured to interface between various system components (not shown) and two 16 Meg SDRAMs 308 and 309. In a typical embodiment, at least one system component is a microprocessor, such as the Intel I960 microprocessor. The software for creating the controller design in the PLD may be written in a High Level Design Language, such as Verilog or VHDL. The assignee of the present invention provides the controller design file to the end user as a "core" which provides highly predictable functionality and performance. For example, the controller core is unaffected by custom logic on the PLD, the user's selection of EDA (electronic design automation) tools, or coding style. As a result, the use of a controller core can save the user several months in design and verification. Advantageously, and described in more detail below, the controller core can be easily modified to fit different memory organizations of system speed and bandwidth requirements.

In FIG. 3, the controller core 300 implemented on the PLD includes an SDRAM controller 301 and a system interface 305. Note that the elements included in SDRAM controller 301 and system interface 305 are not necessarily physically in proximity to one another, but describe generally a common functionality among elements. The pin descriptions for the PLD are shown below in Table 4, which is organized according to system or SDRAM interface.

TABLE 4

PLD Pin Descriptions

| Interface | PIN Name | Direction | Width | Notes |
|---|---|---|---|---|
| System | AD | In/Out | 32 | 1 |
|  | Data_addr_n | In | 1 | 2 |
|  | We_rn | In | 1 |  |
|  | Reset | In | 1 |  |
|  | Clkp | In | 1 | 3 |
|  | Clk_FBp | In | 1 | 4 |
| SDRAM | Sd_data | In/Out | 32 | 5 |
|  | Sd_addr | In | 11 |  |
|  | Sd_ras | Out | 1 |  |
|  | Sd_cas | Out | 1 |  |
|  | Sd_we | Out | 1 |  |
|  | Sd_ba | Out | 1 |  |
|  | Clk_SDp | Out | 1 | 6 |
|  | Sd_cke | Out | 1 |  |
|  | Sd_cs1 | Out | 1 |  |
|  | Sd_cs2 | Out | 1 |  |
|  | Sd_dqm | Out | 1 |  |

Notes:
1 Address and Data Bus (Double Date Rate, explained in detail below).
2 When data_addr_n = 1, AD contains data. When data_addr_n = 0, AD contains an address.
3 62.5 MHz.
4 Feedback clock must connect to Clk_SDp.
5 Single data rate.
6 125 MHz.

The system interface pins data_addr_n and we_rn on the PLD receive command signals from the system. For convenience, these command signals are given the same name as the system interface pins. These command signals generate four basic commands: addr_wr, data_wr, addr_read, and data_read. Note that when command signal data_addr_n is low, the data from AD[29:28] (part of address/data bus AD[31:0]) is used to issue additional SDRAM commands. In this core design, Load SDRAM and Precharge Controller Mode Register are the same command. Table 5 shows the truth table for the system commands.

TABLE 5

System Commands Truth Table

|  |  | Control Signals | | |
|---|---|---|---|---|
| Commands |  | Data_addr_n | We_rn | AD[29:28] |
| Addr_wr | Read/Write | 0 | 1 | 00 |
|  | Auto refresh | 0 | 1 | 11 |
|  | Precharge SDRAM & Load Controller Mode Register (Note 1) | 0 | 1 | 10 |
|  | Load SDRAM Mode Register | 0 | 1 | 01 |
| Data_wr |  | 1 | 1 | Don't care |
| Addr_read |  | 0 | 0 | Same as Addr_wr |
| Data_read |  | 1 | 0 | Don't care |

(Note 1) Every time the system issues a precharge command, it is also loading Controller Mode Register 307.

The following listing summarizes how the system issues different SDRAM commands to controller 300.

To initiate a precharge (PRECHARGE) mode, the system places the Addr_wr command on the bus AD[31:0] and sets the bits on lines AD[29:28] to 10. Then the system places the Data_wr command on the bus. Finally, the system puts the values for controller mode register 307 on AD[20:10].

To initiate an auto-refresh (AUTO_REFRESH) mode, the system places the Addr_wr command on the bus and sets the bits on lines AD[29:28] to 11.

To load the configuration mode register (LOAD_MR), the system places the Addr_wr command on the bus and sets the bits on lines AD[29:28] to 01. The system then places the values for control mode register 307 on AD[20:10].

To begin a write (WRITEA) mode, the system places the Addr_wr command on the bus and sets the bits on lines AD[29:28] to 00. Then, the system places the Data_wr command on the bus. The data is placed on the bus on every clock edge until the end of the burst.

To begin a read (READA) mode, the system places the Addr_rd command on the bus and sets the bits on lines AD[29:28] to 00. Then the system places the Data_rd command on the bus.

Address/multiplexer 306 registers the address from the bus when system control signal data_addr_n is Low. The address is then multiplexed into the SDRAM row and column address. In this embodiment of the present invention, AD[21] maps to the bank of the SDRAM, AD[20:10] maps to the SDRAM row address, and AD[9:2] maps to the SDRAM column address. Assuming all reads and writes are in bursts of eight, AD[1:2] are not used. Table 6 shows the system address to SDRAM address mapping.

TABLE 6

System Address Mapping to x16 16M SDRAM

| SDRAM Address | Row Address | Column Address |
|---|---|---|
| SD_A0 | A10 | A2 |
| SD_A1 | A11 | A3 |
| SD_A2 | A12 | A4 |
| SD_A3 | A13 | A5 |
| SD_A4 | A14 | A6 |
| SD_A5 | A15 | A7 |
| SD_A6 | A16 | A8 |
| SD_A7 | A17 | A9 |
| SD_A8 | A18 | X |
| SD_A9 | A19 | X |
| SD_A10 | A20 | H |
| SD_BA | A21 | A21 |

During the write mode, address/data multiplexer 306 registers data from bus AD[31:0] with double rate clock clk_2x (explained in detail below). Multiplexer 306 gets data at every input clock edge. During the read mode, multiplexer 306 registers data from SDRAMs 308 or 309 with a double rate clock clk_2x and puts the data onto bus AD[31:0].

Figure 4:
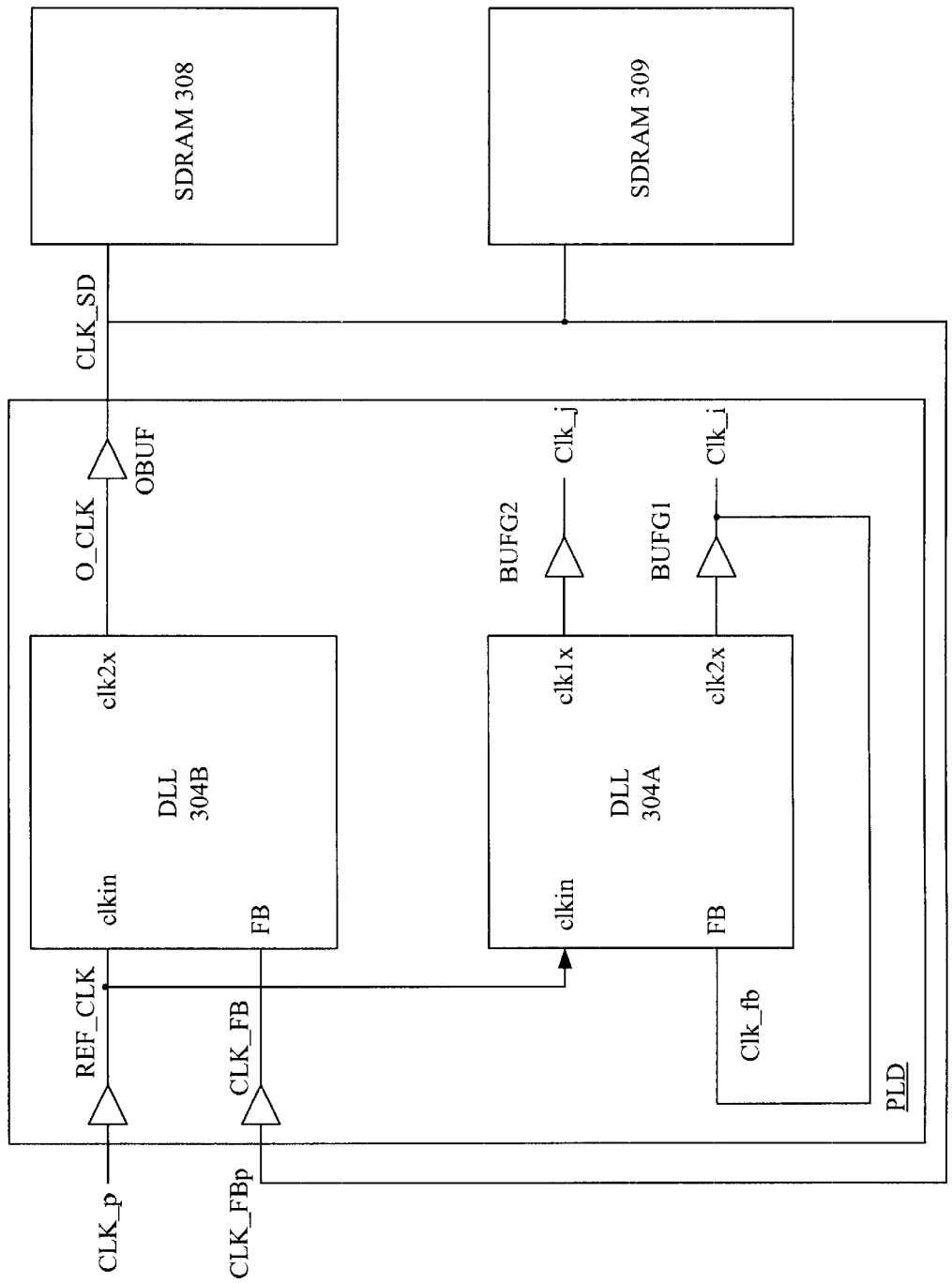
FIG. 4 illustrates two delay lock loops (DLLs) for deskewing the system, PLD, and SDRAM clocks.

Clock skew and clock delay can have a substantial, adverse impact on designs running at higher than 100 MHz. In accordance with the present invention, DLLs 304A and 304B deskew the PLD and SDRAM clocks to optimize the controller design. FIG. 4 illustrates DLLs 304A and 304B in greater detail. In this embodiment, DLL 304B provides a buffered, double clock rate signal CLK_SD to SDRAMs 308 and 309 and receives a clock feedback signal CLK_FBp. DLL 304A provides a standard clock signal (Clk_j) (buffered by a global buffer BUFG2) and the double clock rate signal (Clk_i)(buffered by a global buffer BUFG1) to circuits on the FPGA and receives a clock feedback signal Clk_fb. Note that the double clock rate signal becomes the feedback signal to DLL 304A.

Of importance, one DLL cannot provide both the FPGA and SDRAM clocks because the SDRAM clock goes through an output buffer (OBUF) delay and other off-chip delays, thereby creating skew between the two clocks. In accordance with the present invention, using two DLLs with the same clock input (REF_CLK) and separate feedback signals advantageously achieves zero-delay between the input clock, the FPGA clock (Clk_i), and the SDRAM clock (CLK_SD).

Figure 5:
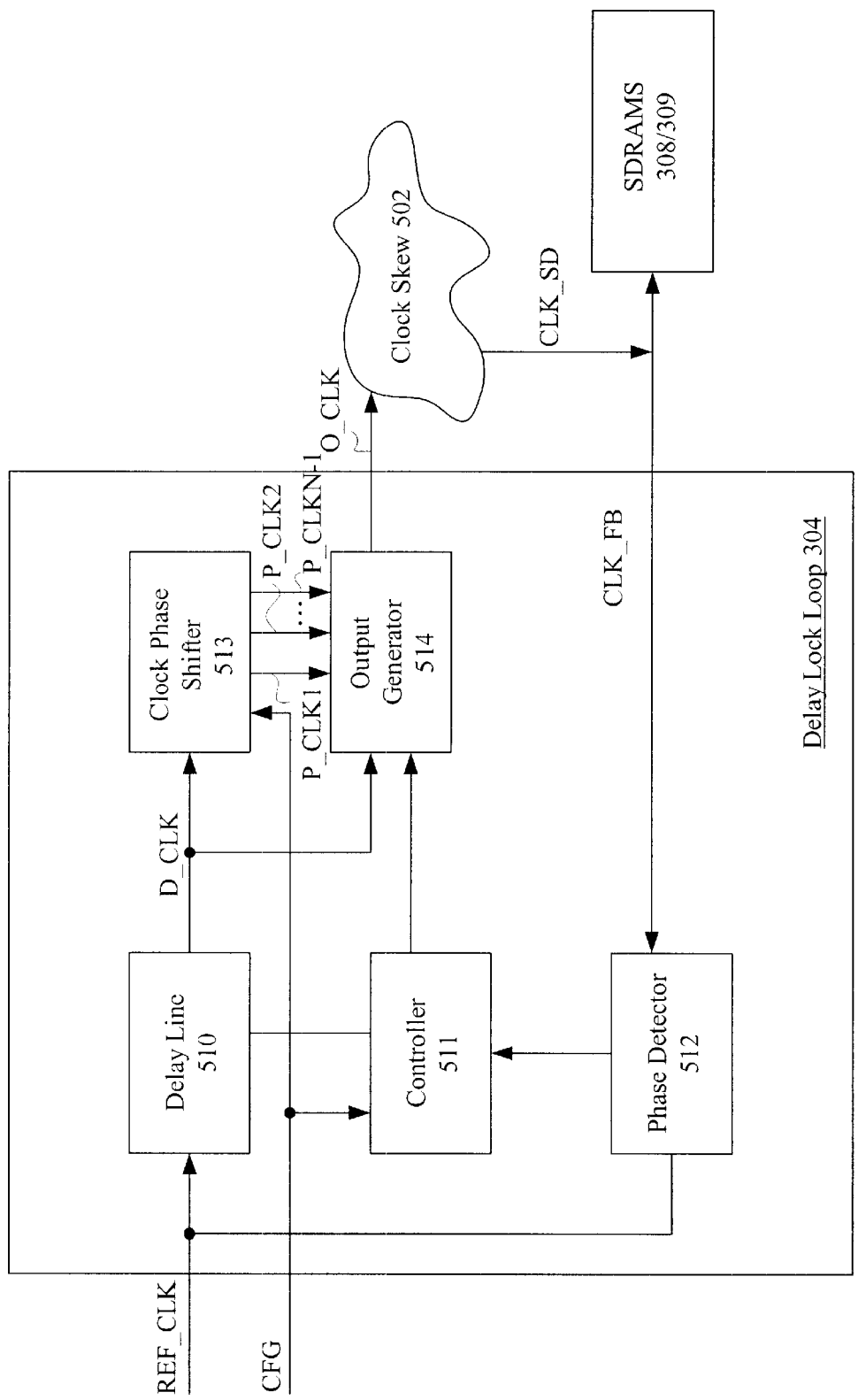
FIG. 5 illustrates a block diagram of a DLL of the present invention.

FIG. 5 illustrates one embodiment of DLL 304 which includes a delay line 510, a clock phase shifter 513, a controller 511, an output generator 514, and a phase detector 512. DLL 304 receives a reference clock signal REF_CLK and generates an output clock signal O_CLOK. As shown, output clock signal 0_CLK is skewed by clock skew 502, thereby generating a skewed clock S_CLK which clocks logic circuits 501. Skewed clock signal S_CLK is also fed back to a feedback terminal FB of DLL 304.

Within DLL 500, an input clock signal REF_CLK is delayed by delay line 510 to generate delayed clock signal D_CLK. Delayed clock signal D_CLK is delayed from clock signal REF_CLK by a predetermined propagation delay in delay line 510. One embodiment of delay line 510 uses an adjustable delay line described in U.S. patent application Ser. No. 09/102,704, entitled "Glitchless Delay Line Using Gray Code Multiplexer", filed on Jun. 22, 1998, which is incorporated by reference herein. However, other adjustable delay lines using voltage controlled delay or series-connected, discrete delay elements can also be used with the DLL of the present invention. Delayed clock signal D_CLK is provided to the input terminals of a clock phase shifter 513 and an output generator 514.

Clock phase shifter 513 generates a plurality of phase-shifted clock signals P_CLK1 to P_CLK_N−1, wherein N is a positive integer. In one embodiment, phase-shifted clock signal P_CLK_1 is phase-shifted 360/N degrees from delay clock signal D_CLK, phase-shifted clock signal P_CLK_2 is phase-shifted 2*360/N degrees, and phase-shifted clock signal P_CLK_N−1 is phased shifted (N−1)*360/N degrees.

The equivalent of phase shifting in a time domain is delaying the clock signal. Thus, if a first phase-shifted clock signal is phase-shifted from a second clock signal by X degrees, the first clock signal is delayed by X*(P/360), wherein P is the period of the first and second clock signals. In this embodiment, clock phase shifter 513 is configured to provide different phase-shifted signals using configuration signals CFG. In one embodiment, clock phase shifter 513 provides four quadrature phases of delayed clock signal D_CLK, doubles D_CLK, or divides D_CLK by 1.5, 2, 2.5, 3, 4, 5, 8, and 16, and provides 6 P_CLK signals. Thus, in addition to eliminating clock distribution delay, clock phase shifter 513 provides advanced control of multiple clock domains.

Clock phase shifter 513 provides the plurality of phase-shifted clock signals P_CLK to an output generator 514. Output generator, also configured by configuration signals CFG, controls whether output generator 514 outputs the delayed clock signal D_CLK or one of the phase-shifted signals P_CLK as the output clock O_CLK. FIG. 4 shows that in one embodiment, the 2x clock is chosen. In this manner, the system clock is half the SDRAM frequency. For example, if the SDRAM interface (signal S_CLK) is at 125 MHz, then clock signal CLK_p, an input signal to the PLD, is at 62.5 MHz.

Controller 511 receives phase information regarding input clock REF_CLK and skewed clock S_CLK from phase detector 512. Specifically, phase detector 512 informs controller 511 whether the propagation delay from delay line 510 should be increased or decreased to achieve synchronization of skewed clock S_CLK with input clock signal REF_CLK.

Note that input clock signal REF_CLK is sourced by a global clock buffer or a global clock input buffer on the PLD. Further note that the output clock signal O_CLK of DLL 304 is essentially a delayed version of the input clock signal. Thus, any instability in the input clock signal is also found in the output clock signal. To provide an acceptable input clock signal to the DLL, a system in accordance with the present invention provides a crystal oscillator to generate the system clock, which in turn is buffered and provided to the DLL. DLL 304 operates reliably on an input waveform with a frequency drift of up to 1 nanosecond. However, the cycle-to-cycle jitter should be less than 300 picoseconds in the low frequencies and 150 picoseconds for the high frequencies.

The components and functioning of DLL 304 are explained in greater detail in U.S. patent application Ser. No. 09/102,704, filed on Jun. 22, 1998 by the assignee of the present invention, which is incorporated by reference herein.

Note that DLL 304 may output multiple signals, however only the necessary clock signals are synchronized with SDRAMs 308/309. Thus, as shown in FIG. 4, DLL 304A outputs a Clk_j and Clk_i signals, but only the Clk_i signal is provided as a feedback signal and thus synchronized with the system (skewed) clock S_CLK.

Referring back to FIG. 3, controller 300 includes a controller mode register 307. Note that controller mode register 307 should not be confused with the SDRAM mode registers located in SDRAMs 308/309. In accordance with the present invention, controller mode register 307 allows the burst length, the CAS latency, the RAS-to-CAS delay, the Refresh count, and the Refresh active period to be reprogrammed without having to recompile the PLD design. Table 7 summarizes the field positions, number of bits, and descriptions for both the SDRAM mode register and controller mode register 307.

TABLE 7

CONTROLLER MODE REGISTER DEFINITIONS

| Field | # of bits | Mode Register Description | SDRAM Values | Controller |
|---|---|---|---|---|
| C1–C0 | 2 | CAS latency | 2,3 | 1,2 |
| C3–C2 | 2 | RAS to CAS latency |  | 0,1 |
| C4–C6 | 3 | Burst length | 1,2,4,8 | 0,1,3,7 |
| C23–C8 | 16 | Refresh count |  | 2000–4000 |
| C27–C24 | 4 | Refresh active period |  | 7 |

As noted in Table 7, a CAS latency value in controller mode register 307 should be one less unit than the value in the SDRAM mode register (the controller mode register 307 begins counting at zero, whereas the SDRAM mode register begins counting at one). Similarly, a burst length value in controller mode register 307 should be one less unit than the value in the SDRAM mode register. The RAS-to-CAS (RCD) delay is set to $(t_{RCD}/t_{CLK})-2$ (in one example, time $t_{RCD}$ is 30 nanoseconds and time $t_{CLK}$ is 10 nanoseconds).

In accordance with the present invention, controller mode register 307 directs a state machine 302 to periodically issue a refresh command to SDRAMs 308/309. The refresh count should be set to $t_{REF}/(t_{CLK}\times\text{the number of rows in SDRAMs } 308/309)$, wherein time $t_{REF}$ is a refresh time (in one example, time $t_{REF}$ is 64 milliseconds and the number of rows is 2048). The refresh active period determines the length of the wait state in controller mode register 307 before sending a new command after a refresh command. In one embodiment, the value is set to $(t_{RC}/t_{CLK})-3$, wherein time $t_{RC}$ is the auto refresh active command time (in one example, time $t_{RC}$ is 80 nanoseconds).

Controller mode register 307 must be loaded before any SDRAM operations are started. With the exceptions of the CAS latency and the burst length, the values programmed in controller mode register 307 should match the corresponding values programmed in the SDRAM mode register (shown as blanks in Table 7). As mentioned previously, controller mode register 307 is programmed when the system issues a PRECHARGE command.

Note that, in accordance with the present invention, the configurable logic of the PLD advantageously allows a user to selectively provide one of a plurality of burst lengths, as well as one of a plurality of sequences of memory access in a burst mode. Thus, the present invention ensures optimal flexibility in the burst mode.

Figure 6:
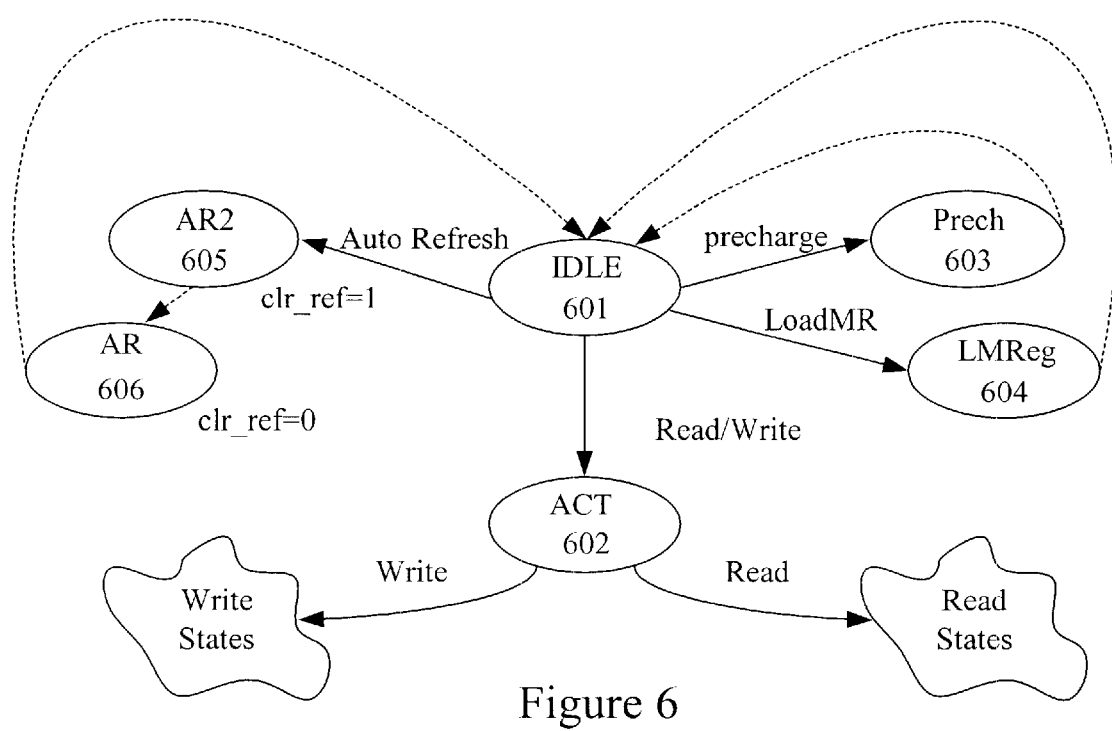
FIG. 6 illustrates a state diagram of an SDRAM controller in various modes of operation.

FIG. 6 illustrates an overview of the operation of state machine 302 (FIG. 3). The controller awakens in an IDLE state 601 and then changes to one of the precharge (Prech) state 603, the load controller mode register (LMReg) state 604, the auto-refresh (AR2) state 605, or the activate row (ACT) state 602, depending on the system command. The dashed lines in the state machine diagram indicate an automatic sequence for one embodiment of the present invention. Note that in the auto-refresh state actually requires two states: one state AR2 605 to enable a clear refresh (clr_ref=1), and another state AR 606 to disable the clear refresh (clr_ref=0).

Figure 7:
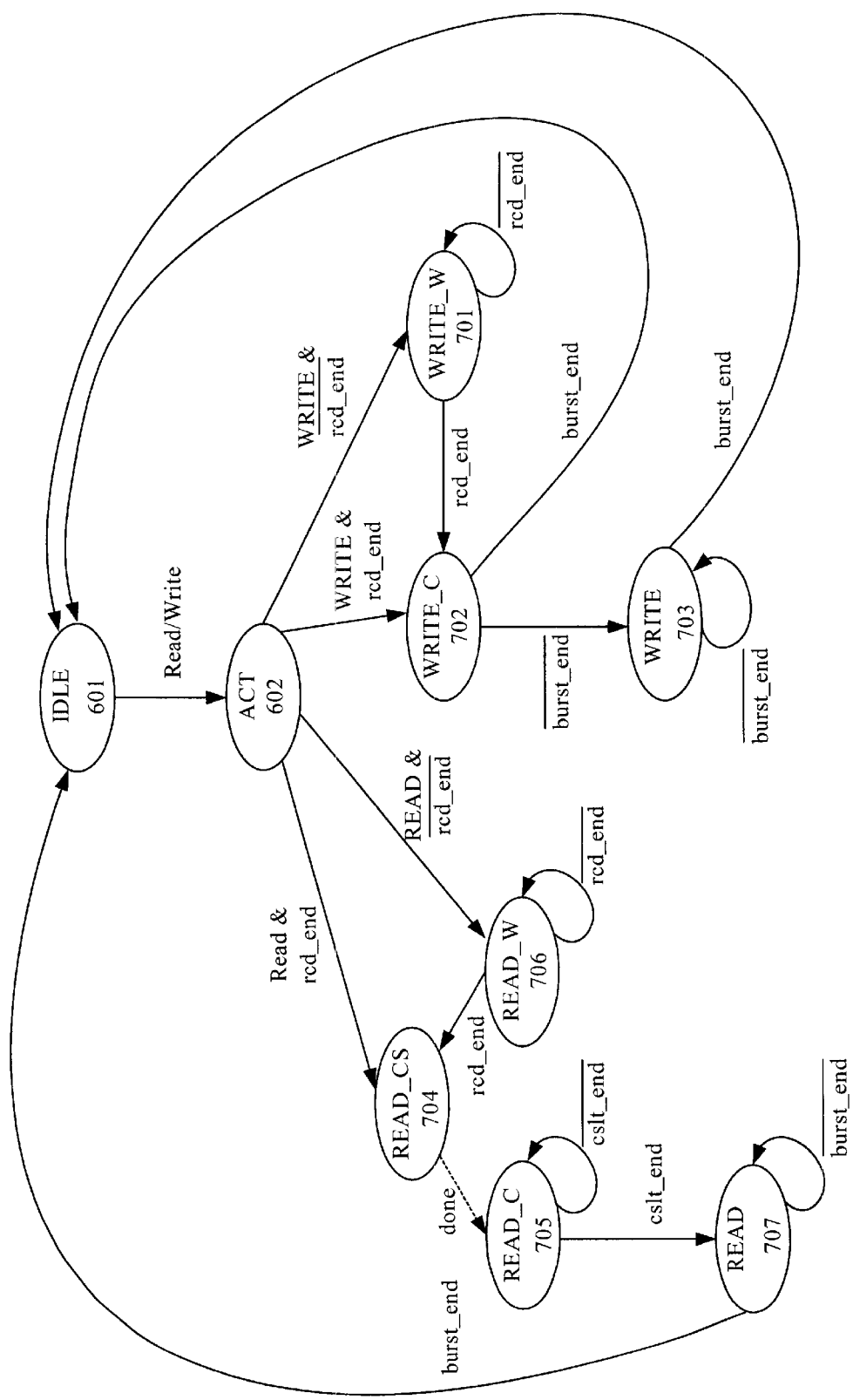
FIG. 7 illustrates a state diagram of the read and write states for an SDRAM controller.

Read and Write states are explained in detail in reference to the state machine shown in FIG. 7. During a Write operation, the controller needs to check for the end of RAS-to-CAS (row address strobe to column address strobe) delay (which corresponds to a mandatory data hold time) as well as burst end. If a WRITE command is issued, but the data hold time has not been met (indicated by the rcd_end (bar) command), then the controller enters a Write Wait for Ras-to-Cas Delay (WRITE_W) state 701. If a WRITE command is issued, and the data hold time has been met (indicated by the rcd_end command), then the controller enters a Write Command (WRITE_C) state 702 in which the controller issues the first data (typically one word) and a WRITE command to the SDRAM. If only the first data is to be written, the controller returns to IDLE state 601. If more than the first data is to be written, the controller continues to provide data in a write (WRITE) state 703 until burst end, at which point the controller returns to IDLE state 601.

During Read, in addition to checking RAS-to-CAS delay and burst end, the controller also needs to check for CAS latency (corresponding to the time necessary to access data at a memory location and indicated on FIG. 7 by the cslt_end command). If a READ command is issued, but the data hold time has not been met, then the controller enters a Read Wait for Ras-to-Cas Delay (READ_W) state 706. If a READ command is issued, and the data hold time has been met, then the controller enters a Read Command (READ_CS) state 704 and issues a READ command to the SDRAM.

When done, the controller automatically enters a Read Command, Wait for Cas Latency (READ_C) state 705. After the READ command is issued and data can be accessed, the controller reads data in a read (READ) state 707 until burst end, at which point the controller returns to IDLE state 601.

Figure 8:
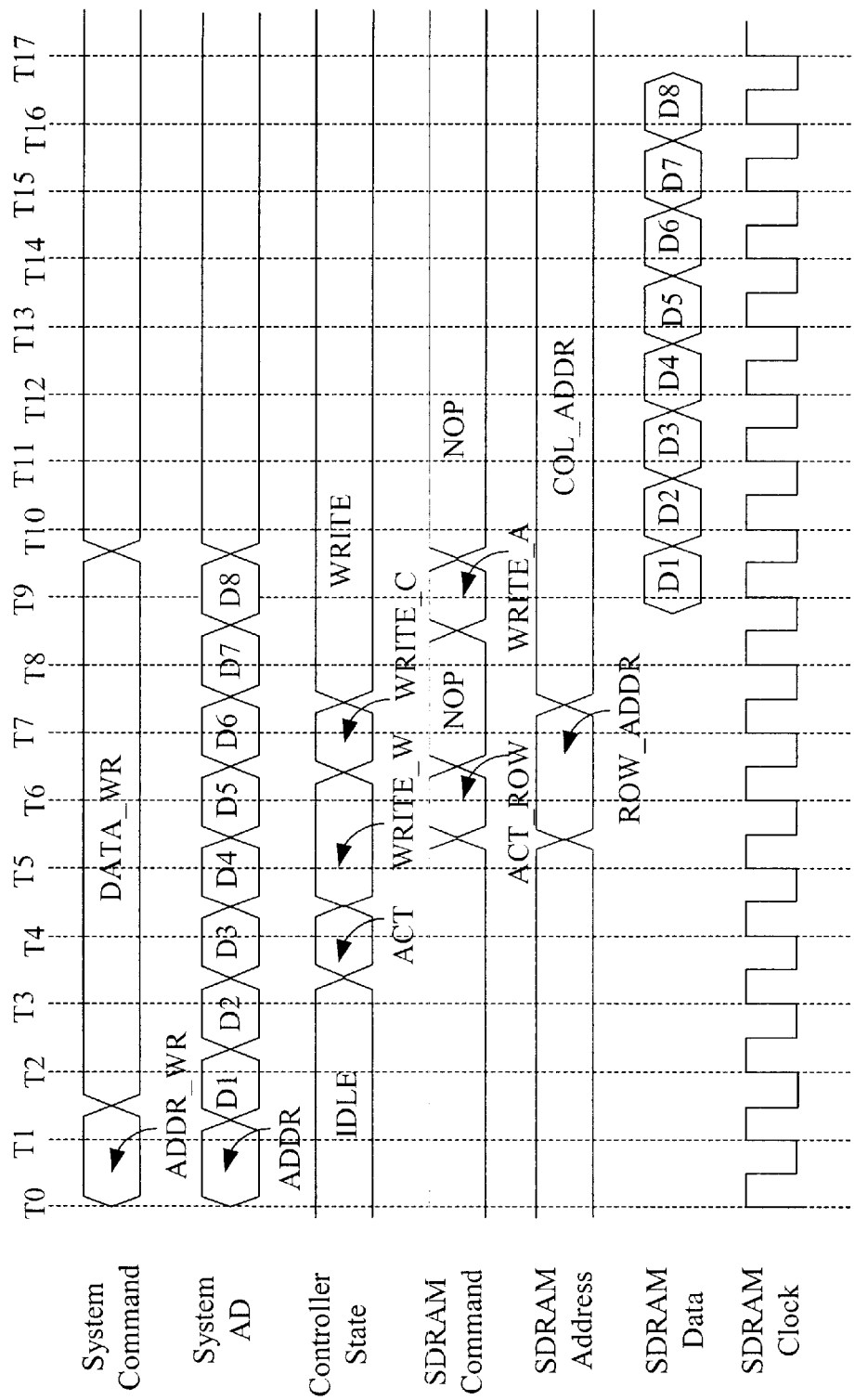
FIG. 8 illustrates a timing diagram of a write access on an SDRAM.
Figure 9:
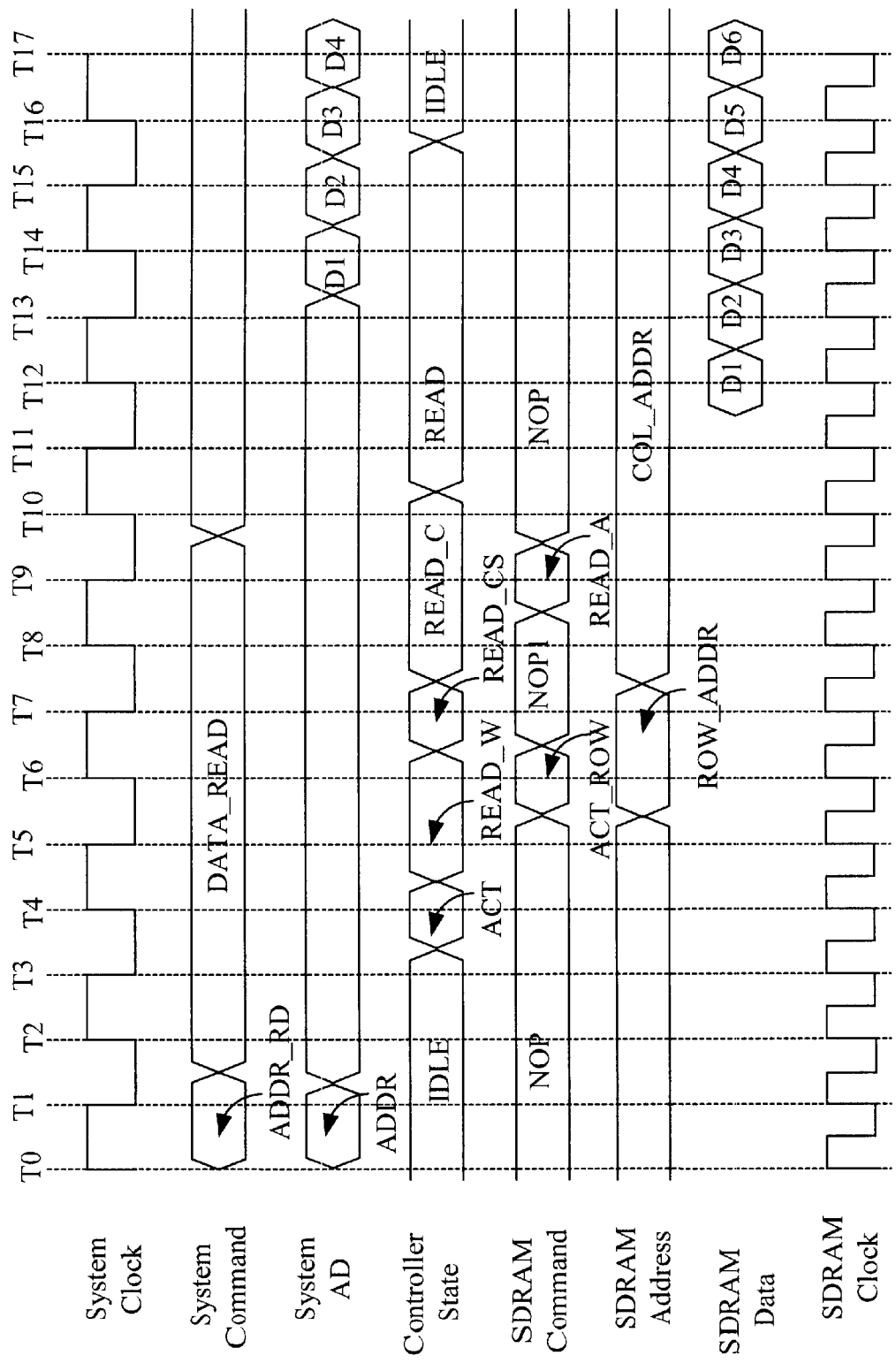
FIG. 9 illustrates a timing diagram of a read access on an SDRAM.

FIGS. 8 and 9 illustrate timing diagrams for write and read cycles, respectively. Note that in these diagrams, the system clock provided to the controller (PLD) is half the speed of the controller output and SDRAM clocks. During a write cycle, i.e. a burst of eight data words D1–D8, the following signals are received and processed. At time T1 shown in FIG. 8, the system places an address write (ADDR_WR) command on the bus and sets bus AD[29:28] (see also FIG. 3) to 00. At time T2, the system places a data write (DATA_WR) command on the bus and also places the first data word D1 on AD. All subsequent data words D2–D8 are placed on AD after every positive edge of the SDRAM clock. The controller initiates the activate state ACT at time T4, the write/wait (WRITE_W) state at time T5, and the write/command (WRITE_C) state at time T7. The SDRAM sees the associated ACT command and row address (ROW_ADDR) at time T6. After RAS-to-CAS delay (in this embodiment at time T9), the SDRAM receives a write data (WRITEA) command and the first data word D1. The burst write of eight words (D1–D8) is completed at time T16.

During the read cycle shown in FIG. 9, at time T1 the system places an address read (ADDR_RD) command on the bus, bus AD[29:28] is set to 00, and the SDRAM address is set on AD[21:2]. At time T2, the system places the data read (DATA_READ) command on the bus and bus AD is disabled. The controller enters the activate (ACT) state and then the read/wait state (READ_W) at times T4 and T5, respectively. The SDRAM sees the ACT command and row address (ROW_ADDR) at time T6. After the RAS-to-CAS delay (indicated as NOP1 in FIG. 9), the SDRAM receives the read address (READA) command and the column address (COL_ADDR) at time T9. Note that to assure proper processing, the column address is provided at least one period before the read address command. After the CAS latency delay (in this embodiment, three periods), the SDRAM places the first data D1 on the bus. The system receives all eight words of data at time T21 (not shown).

Timing of all signals interfacing to the SDRAM is critical. Specifically, the input/output times for all such interface signals from the controller must be faster than the input/output times associated with the SDRAM. Illustrative input/output times for the MT48LC1M16A1 SDRAM and the Xilinx Virtex FPGA are provided below in Table 8.

TABLE 8

SDRAM and PLD Input/Output Times

| Device | $t_{OH}$ | $t_{AC}$ | $t_{SU}$ | $t_{HOLD}$ | $t_{CYC}$ |
|---|---|---|---|---|---|
| SDRAM | 3.0 | 6.0 | 2.0 | 1.0 | 8 ns |
| PLD | 1.0 | 3.9 | 1.7 | 0.0 | 8 ns |

Times $t_{OH}$, $t_{AC}$, $t_{SU}$, $t_{HOLD}$, and $t_{CYC}$ refer to the output data hold time, the time from clock in to valid data out, the data set up time, the input data hold time, and the period, respectively.

In a Write cycle, all signals from the controller (PLD) must meet the setup and hold times of the SDRAM device. Specifically, $$PLD\ t_{AC} + \text{board delay} + SDRAM\ t_{Su} \leq T_{CYC} \qquad (Eq.\ 1)$$

Thus, using the illustrative times of Table 8, $$3.9 + \text{board delay} + 2.0 \leq 8.0\ \text{ns} \qquad (Eq.\ 2)$$

Therefore, in this example, the board delay must be less than 2.1 nanoseconds (typically an ample margin).

Note that the SDRAM has a 1 nanosecond input data hold time requirement. Currently, the PLD output data hold time ($t_{OH}$) is in the range of 1 ns for all clocked LVTTL outputs with drive capability below 16 mA.

In contrast to the Write cycle, in a Read cycle, the data must meet the setup and hold of the PLD. Specifically, $$SDRAM\ t_{AC} + \text{board delay} + PLD\ t_{SU} < T_{CYC} \qquad (Eq.\ 3)$$

Thus, using the illustrative times of Table 8, $$6.0 + \text{board delay} + 1.7 \leq 8.0\ \text{ns} \qquad (Eq.\ 4)$$

Therefore, in this example, the board delay must be less than 0.3 nanoseconds (still typically an acceptable margin).

Figure 10:
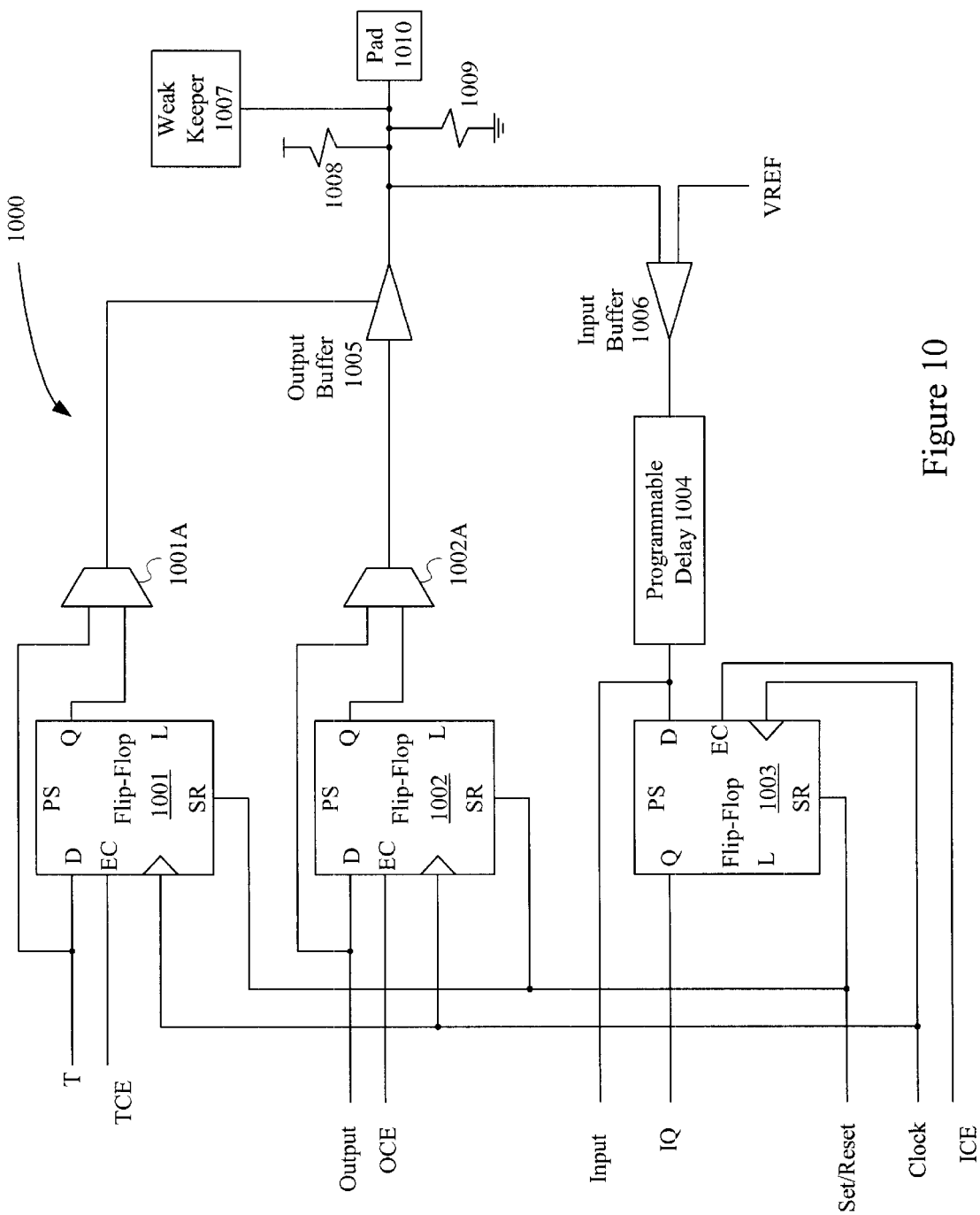
FIG. 10 illustrates a simplified block diagram of an input/output block providing selectable no-delay paths.

In accordance with one embodiment of the present invention, the PLD has a zero hold time requirement. FIG. 10 illustrates an I/O block 1000 provided in the Xilinx Virtex FPGA that ensures the zero hold time requirement. In I/O block 1000, multiplexer 1002A selectively provides the registered output signal from flip-flop 1002 or the non-registered signal Output to output buffer 1005. In accordance with the present invention, the registered output signals are provided to the SDRAMs.

Note that the tristate signal T for output buffer 1005 is also registered by a flip-flop 1001 (thereby providing a synchronous enable and disable), but is only selectively provided to output buffer 1005 by a multiplexer 1001A. Each output buffer 1005 can be individually programmed for a plurality of low voltage signaling standards. In many signaling standards, the output High voltage depends on an externally supplied voltage VCCO. The use of voltage VCCO is well known in the art, and therefore is not explained in detail herein. In one embodiment, output buffer 1005 sources up to 24 milliamps and sinks up to 48 milliamps. The drive strength and slew rate of output buffer 1005 are controlled using standard methods to minimize bus transients.

The input signal to the internal logic of the FPGA from input buffer 1006 is provided both in its non-registered form, Input, as well as in its registered form (flip-flop 1003), IQ. In accordance with the present invention, the registered signals from the SDRAMs are provided to the FPGA.

In one embodiment, each input buffer 1006 in the FPGA can be configured to conform to a plurality of low voltage signaling standards. In some of these standards, input buffer 1006 uses a user-supplied reference voltage VREF (used, for example, if input buffer 1006 implements a differential amplifier input buffer). These standards are well known in the art and therefore are not explained in detail herein.

A programmable delay 1004, coupled to the output of input buffer 1006, eliminates pad-to-pad hold time. Specifically, the delay is matched to the internal clock distribution delay of the FPGA, and therefore ensures that the pad-to-pad hold time is zero.

Optional pull-up and pull-down resistors 1008/1009 (typically between 50–150 kOhms) are connected to pad 1010 and are selectively used after configuration to provide predetermined values on pad 1010. An optional weak keeper circuit 1007 is also connected to each pad 1010. If selected, circuit 1007 monitors the voltage on pad 1010 and weakly drives its associated pin High or Low to match the input signal. If the pin is connected to a multiple-source signal, circuit 1007 holds the signal in its last state (assuming all drivers are disabled). In this manner, a valid logic signal is guaranteed, thereby eliminating bus chatter.

In accordance with the present invention, the SDRAM controller application includes its own batch language, i.e. a set of commands that the system executes sequentially as a program. This batch language can be submitted directly to the operating system for execution. The process of transcribing that list of commands is called scripting. The details of the synthesis and place and route scripts are presented below.

For the synthesis script, the following programs sets the period constraints for clock signals Clk_i and Clk_j (see FIG. 4).

create_clock Clk_i -period 10 -waveform {0 5}
    create_clock Clk_j -period 20 -waveform {0 5}

Constraints are instructions placed on symbols or nets in a PLD or PLD schematic/textual entry files, such as VHDL or Verilog. Constraints can indicated placement, implementation, naming, directionality, or timing (such as the above-referenced periods).

For the place and route script, the periods for each clock are specified along with the time specification for paths between clk1x and clk2x (see FIG. 4).

NET "Clkp" PERIOD=16 ns ;
    NET "Clk_j" PERIOD=16 ns
    NET "Clk_i" PERIOD=8 ns ;
    NET Clk_i TNM=c2x;
    NET Clk_j TNM=c1x;
    TIMESPEC TS10=FROM: c2x: TO: c1x: 8 ns;
    TIMESPEC TS11=FROM: c1x: TO: c2x: 8 ns;

In accordance with the present invention, logical constraints, i.e. those constraints entered before a design is mapped to the PLD, are placed in a user's constraint file (ucf). This user-created ASCII file is tailored for the specific SDRAM and PLD used in the design. Generation of the ucf is well known in the art, and therefore is not explained in detail herein. All place and route constraints for a particular application are placed in separate files. Thus, all SDRAM constraints are provided in an SDRAM user constraint file (sdrm.ucf).

For signals going to the SDRAMs 308/309, the OFFSET attribute is used to subtract the SDRAM clock-to-out delay/setup and board delay from the PERIOD.

The min setup (Tsu) of the SDRAM-8 is 2 ns, plus 500 ps of board delay
    #we need to add this OFFSET to all outputs to SDRAM
    #
    NET sd_add[*] OFFSET=OUT:2.5:BEFORE:Clkp;
    NET sd_data[*] OFFSET=OUT:2.5:BEFORE:Clkp;
    NET sd_ras OFFSET=OUT:2.5:BEFORE:Clkp;
    NET sd_cas OFFSET=OUT:2.5:BEFORE:Clkp;
    NET sd_we OFFSET=OUT:2.5:BEFORE:Clkp;
    NET sd_ba OFFSET=OUT:2.5:BEFORE:Clkp;
    #
    #The max clock-to-out (Tac) of the SDRAM-8 is 6 ns, plus 300 ps of board delay
    #we need to add this OFFSET to all inputs from SDRAM
    NET sd_data[*] OFFSET=IN:6.3:AFTER:Clkp;

Finally, the following script sets the NODELAY mode for inputs from SDRAM.

Figure 11:
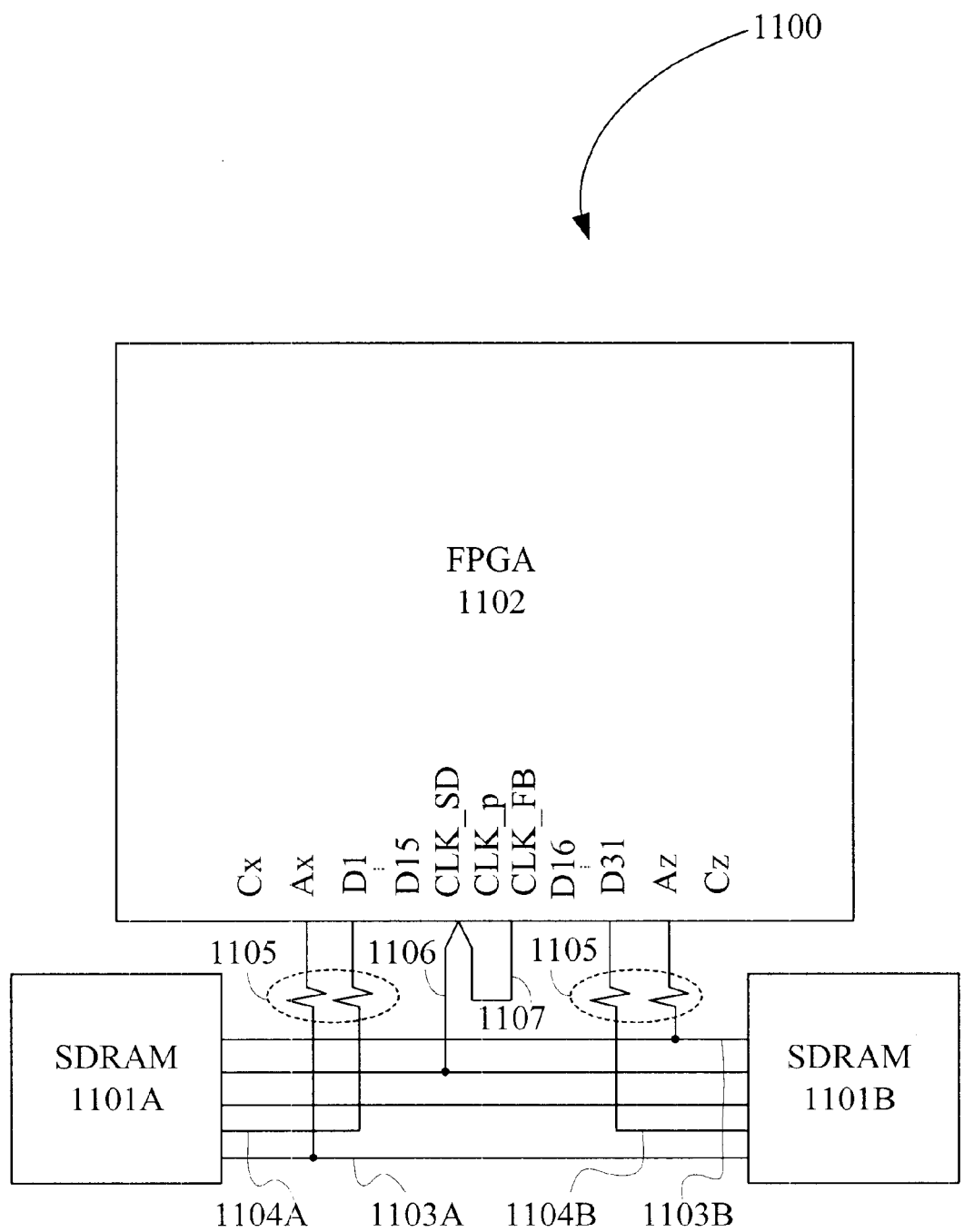
FIG. 11 illustrates a simplified block diagram of a PLD, and various pins on that PLD, being connected to two SDRAMs.

By default, the IBUF has a DELAY element to guarantee 0 hold time
    #By turning off the DELAY element, we save ~500 ps in IBUF delay
    NET sd_data[0] NODELAY;
    NET sd_data[1] NODELAY;

The trace command below is used to verify whether the constraints specified in the ucf are met. tre -v -u sdrm_par sdrm.pcf FIG. 11 illustrates a printed circuit board reference design 1100 for two 32-bit wide Micron MT48LC1M16A1 SDRAMs 1101A and 1101B interfacing to a Xilinx Virtex FPGA XCV300 device 1102 in a BGA 432 package. In this design, the PC board trace impedance is controlled to 50 Ohms and SDRAMs 1101 are located within two inches of FPGA 1102.

To combat system noise, all address lines 1103A/1103B and data lines 1104A/1104B are terminated with source terminating resistors 1105 located as close as possible to the FPGA package. In this embodiment, each resistor 1105 is 33 Ohms. These resistors improve module performance by greatly reducing signal noise on the traces. To make the traces between FPGA 1102 and SDRAMs 1101 as short as possible, all data lines 1104 are driven from the pins located in the relative center of the package side facing SDRAMs 1101. The address pins (Ax/Az) and control pins (Cx/Cz), which border the data pins (D1 . . . D15/D16 . . . D31), have two loads since both SDRAMs 1101 get the same address and control signals.

In this embodiment, a clock output pin CLK_SD (having the same designation as its associated signal), a clock input pin CLK_p, and a clock feedback input pin CLK_FB are placed in close proximity for DLL efficiency. In accordance with the present invention, two traces are driven out of clock output pin CLK_SD. A first trace 1106 drives the two SDRAM clock inputs on both packages. A second trace 1107 loops back to drive clock feedback input pin CLK_FB on FPGA 1102. Assuming that the two clock input loads on SDRAMs 1101 are almost equivalent to one FPGA clock feedback input load, the two traces 1106/1107 are made equal in length, thereby guaranteeing that the delay to the SDRAM clock pin is the same as the delay to the clock feedback input pin.

The delay of a signal along a wire can vary based on inductance and capacitance. Even well designed boards can experience delays of 180 picoseconds per inch. Transmission line effects typically start at 1.5 inches for fast (1.5 nanosecond) rise and fall times. Therefore, in a preferred embodiment, the length of each trace 1106/1107 is kept below two inches.

For a more complex configuration, a commercially available PC board design tool can be used to analyze the trace signal integrity. Xilinx provides IBIS models (on its Web site at the following location:
ftp://ftp.xilinx.com/pub/swhelp/ibis/) for all of the Virtex family I/Os for use with these tools. An IBIS model generally provides information on input/output characteristics. More specifically, IBIS models 1. best case and worst case models by using the minimum and maximum current with the proper minimum and maximum ramp rates;
2. SSO (Simultaneous Switching Output), i.e. mainly the package inductance, other associated parasitics, and the number of buffers switching;
3. R, L and C in matrix format and the use of a matrix for the inductance accounts for the "loop" inductance, i.e. the mutual inductance between the pins (note that specifying the mutual inductance is necessary to account for SSO event simulation); and 4. the package parasitic information necessary to simulate ground bounce.

SDRAM output IBIS models are also available from a variety of memory vendors. Designers can insure signal integrity of all signals on the board by using these tools and the available input/output models.

The following is a summary of the design techniques used in the SDRAM controller to optimize performance:

use DLLs and Global Clock Buffers to remove all clock delays and clock skew;

use "fast" output buffers for all output signals to the SDRAM. Fast output buffers are explained in detail in U.S. Pat. No. 5,319,252, issued to Pierce, et. al. on Jun. 7, 1994, and U.S. Pat. No. 5,331,220, issued to Pierce, et al. on Jul. 19, 1994, both being incorporated by reference herein. The fast output buffers are approximately 2 nanoseconds faster than the regular output buffers;

use an input buffer in non-DELAY mode on all input signals from the SDRAM. These non-DELAY buffers are about 500 picoseconds faster than the default input buffers;

ensure all signals interfaced to the SDRAM and the system, and the Tri-state signal for the SDRAM data, are registered in the PLD IOB;

duplicate selected high fan-out signals to reduce net delay (For example, the sd_data 3-state signal has a fan-out of 32. In one embodiment, this signal is duplicated to four signals, each having eight loads);

specify timing constraints in the ucf file; and use the one_hot state machine as shown in FIGS. 6 and 7.

Although the present invention has been described in various embodiments, those skilled in the art will appreciate that various changes, substitutions, and alterations can be made without departing from the spirit and scope of the invention as defined by the following claims.

I claim:

1. A method of implementing a synchronous dynamic random access memory (SDRAM) controller in a programmable logic device (PLD), the method comprising:

using configurable logic of the PLD to form an interface between a system and an SDRAM;

using the configurable logic to form a state machine to operate the controller and the interface; and eliminating skew between a system clock, a global clock in the PLD, and an SDRAM clock using dedicated circuits of the PLD, wherein using the configurable logic to form a state machine includes the following steps during a Write operation:

if the system issues a WRITE command, but a Ras-to-Cas Delay time in the SDRAM has not been met, then the controller enters a Write Wait for Ras-to-Cas Delay state; and if the system issues a WRITE command, and the Ras-to-Cas Delay time in the SDRAM has been met, then the controller enters a Write Command state in which the controller issues data and a WRITE command to the SDRAM.

2. The method of claim 1, wherein after the WRITE command is issued, the controller continues to provide data in a Write state until burst end.

3. The method of claim 2, wherein after burst end, the controller returns to an Idle state.

4. A method of implementing a synchronous dynamic random access memory (SDRAM) controller in a programmable logic device (PLD), the method comprising:

using configurable logic of the PLD to form an interface between a system and an SDRAM;

using the configurable logic to form a state machine to operate the controller and the interface; and eliminating skew between a system clock, a global clock in the PLD, and an SDRAM clock using dedicated circuits of the PLD, wherein using the configurable logic to form a state machine includes the following steps during a Read operation:

if the system issues a READ command, but a Ras-to-Cas Delay time in the SDRAM has not been met, then the controller enters a Read Wait for Ras-to-Cas Delay state; and if the system issues a READ command, and the Ras-to-Cas Delay time in the SDRAM has been met, then the controller enters a Read Command state and issues a READ command to the SDRAM.

5. The method of claim 4, wherein after the Read Command state, the controller automatically enters a Read Command, Wait for Cas Latency state.

6. The method of claim 5, wherein after the Read Command, Wait for Cas Latency state, the controller reads data in a Read state until burst end.

7. The method of claim 6, wherein after burst end, the controller returns to an Idle state.

* * * * *